United States Patent [19]

Hool et al.

[11] Patent Number: 4,893,473

[45] Date of Patent: Jan. 16, 1990

[54] RESERVOIR-FORMED SHOULDER STOP FOR MAKEUP FLUID VALVE ACTUATION IN PULL-TYPE MASTER CYLINDER

[75] Inventors: Patrick H. Hool, St. Clair; Glenn R. Gualdoni, Birmingham, both of Mich.

[73] Assignee: Lucas Industries Public Limited Company, Birmingham, England

[21] Appl. No.: 146,347

[22] Filed: Jan. 21, 1988

[51] Int. Cl.4 .................. B60T 11/22; B60T 11/28; F15B 7/08
[52] U.S. Cl. ........................ 60/589; 60/585; 92/142; 92/163; 92/169.1; 29/510; 29/516
[58] Field of Search ............... 60/533, 585, 589, 592; 92/82, 142, 163, 164, 169.1, 171; 29/510, 516

[56] References Cited

U.S. PATENT DOCUMENTS

| | | | |
|---|---|---|---|
| 2,060,846 | 11/1936 | Bowen | 60/589 |
| 2,152,499 | 3/1939 | Rasmussen | 60/589 |
| 2,205,806 | 6/1940 | Belenkij | 60/589 |
| 2,487,512 | 11/1949 | Berger | 29/510 X |
| 2,957,734 | 10/1960 | McLeod | 29/516 |
| 3,811,367 | 5/1974 | Bimba | 92/169.1 X |
| 4,418,534 | 12/1983 | Dufft | 60/585 |
| 4,756,160 | 7/1988 | Wimbush | 60/589 |
| 4,783,897 | 11/1988 | Basnett | 92/164 X |

FOREIGN PATENT DOCUMENTS

| | | | |
|---|---|---|---|
| 802494 | 2/1951 | Fed. Rep. of Germany | 60/585 |
| 890024 | 9/1953 | Fed. Rep. of Germany | 60/585 |
| 1071511 | 12/1959 | Fed. Rep. of Germany | 60/585 |
| 1939707 | 2/1971 | Fed. Rep. of Germany | 92/169.1 |
| 1219421 | 12/1959 | France | 60/585 |
| 1239269 | 7/1960 | France | 60/585 |
| 2239605 | 2/1975 | France | 92/169.1 |
| WO87/03850 | 7/1987 | PCT Int'l Appl. | 92/171 |
| 1078611 | 8/1967 | United Kingdom | 60/589 |

*Primary Examiner*—Robert E. Garrett
*Assistant Examiner*—George Kapsalas
*Attorney, Agent, or Firm*—Harness, Dickey & Pierce

[57] ABSTRACT

A fabricated master cylinder having a reservoir part and in interlocked cylinder part defining a cylinder bore and which a slidable piston is supported. The reservoir part that extends into the cylinder bore defines a shoulder that cooperates with a recuperation valve for forming an actuating stop for holding the makeup fluid recuperation valve in an opened position when the piston is at its at rest position.

11 Claims, 2 Drawing Sheets

RESERVOIR-FORMED SHOULDER STOP FOR MAKEUP FLUID VALVE ACTUATION IN PULL-TYPE MASTER CYLINDER

BACKGROUND OF THE INVENTION

This invention relates to a pull type master cylinder and more particularly to an improved fabricated master cylinder and a valving arrangement therefor.

Fluid cylinders are employed for a wide variety of purposes. For example, in automotive applications a fluid cylinder may be employed as the actuating device for the vehicular brakes or clutch. Such fluid cylinders normally include the fluid motor per se and a reservoir for containing fluid for makeup to the cylinder to compensate for wear in the system or fluid losses. Frequently, these master cylinders are formed as castings. Although the use of castings for this purpose has a number of advantages, such as low cost, there are also disadvantages to such one piece cast constructions.

In the first instance, when a master cylinder and reservoir are formed as an integral component, it is necessary that all parts of the master cylinder housing be formed from the same material. This, of course, limits the choice of materials and frequently results in a heavier than desired construction. In addition, the use of cast master cylinders gives rise to certain other disadvantages, particularly where machining operations are required internally of the cylinder housing.

For example, in a type of master cylinder known as a "pull type" the piston is actuated by applying a pulling force rather than a pushing force to it. With this type of system, it is the practice to provide a recuperation valve that extends through the piston so as to permit makeup fluid to flow through the piston to the pressurized side on release or return operation to pass makeup fluid if required. These valves normally employ a position responsive member so that the valve will be manually opened when the piston is moved to its at rest position. As a result, it is necessary to provide some form of stop or shoulder for operating the valve and this frequently necessitates the machining of a shoulder or of a retainer portion to hold a stop in the bore. As a result, the cost savings of the cast construction may be lost.

It is, therefore, a principal object of this invention to provide an improved, simplified and fabricated master cylinder assembly.

It is a further object of this invention to provide a fabricated master cylinder assembly wherein machining operations can be substantially reduced.

It is another object of the invention to provide a fabricated master cylinder assembly that permits the use of different types of materials for the components of the master cylinder.

SUMMARY OF THE INVENTION

A first feature of the invention is adapted to be embodied in a fabricated master cylinder arrangement that comprises a reservoir housing including a first portion defining a cavity adapted to contain fluid for makeup and a second portion having a cylindrical outer surface. A cylinder part is defined by a tubular member and is mechanically interlocked at one end thereof with the reservoir housing first portion and defines a bore for receiving a sliding piston. Means form a closure for the other end of the tubular member.

Another embodiment of the invention is adapted to be incorporated in a fabricated master cylinder comprising a reservoir housing with a first portion that defines a cavity that is adapted to contain a fluid for makeup and a second projecting portion having an end surface. A second part has a generally cylindrical bore that is received upon and fixed to the projecting portion with the end surface extending into the cylinder bore and forming a shoulder therein. A piston is slidably supported in the cylinder bore and divides the bore into first and second chambers. Means are accessible from externally of the cylinder bore for moving the piston to pressurize the first bore chamber. Passage means extend through the piston for permitting flow between the chambers and recuperation valve means control the flow through the passage means. In accordance with this embodiment of the invention, the shoulder forms an end surface that provides an abutment against which the recuperation valve means reacts for holding the valve means in an opened position when the piston is at an at rest condition.

DETAILED DESCRIPTION OF THE PREFERRED EMBODIMENT OF THE INVENTION

Figure 1:
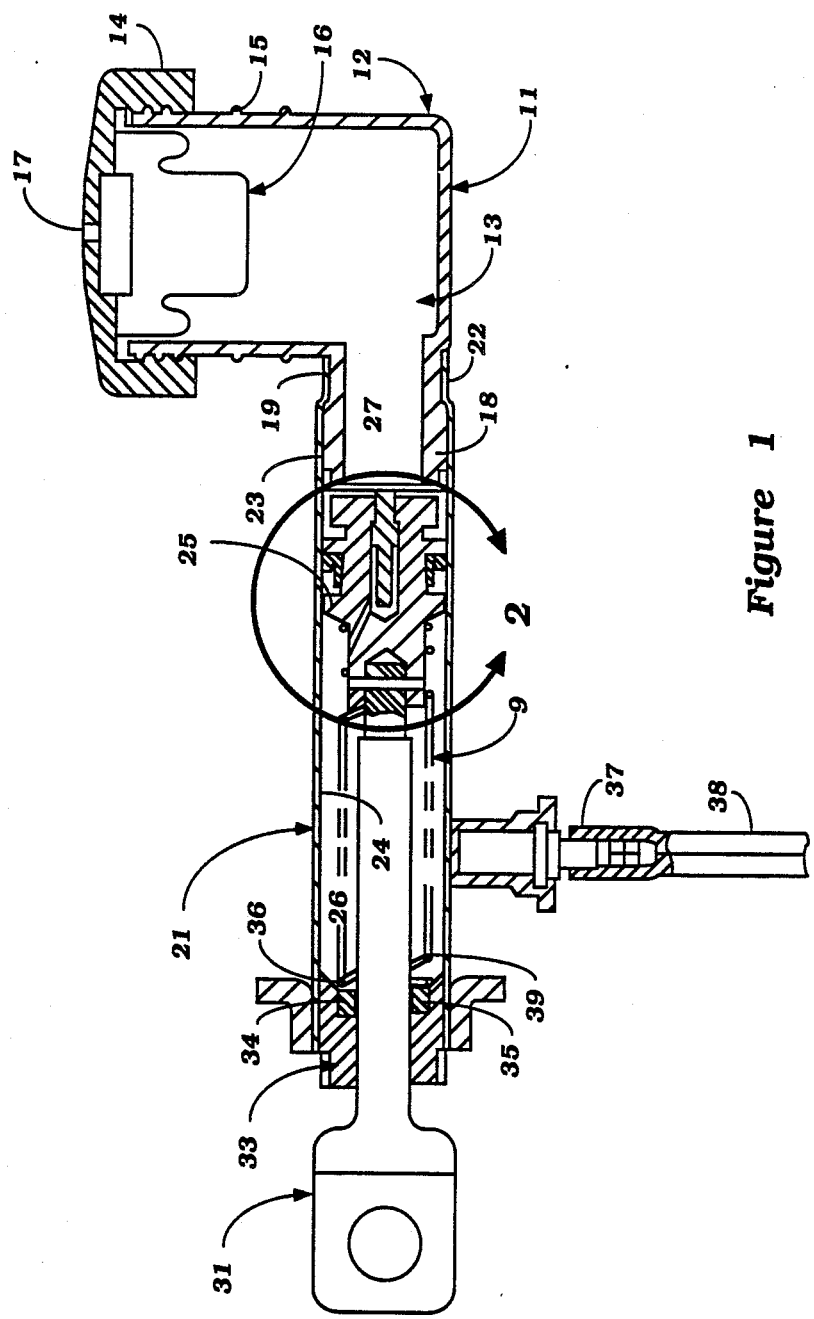
FIG. 1 is a longitudinal cross-sectional view taken through a master cylinder constructed in accordance with an embodiment of the invention.

Referring first to FIG. 1, a master cylinder constructed in accordance with an embodiment of the invention is indicated generally by the reference numeral 11. The master cylinder 11 is made up of a first part, indicated generally by the reference numeral 12 which forms a reservoir for containing makeup fluid and also provides for a stop arrangement for the recuperation valve, as will be described. The reservoir part 12 is formed with a cavity 13 that provides a reservoir for containing fluid for the associated fluid system. The master cylinder 11 may be used in any of a wide variety of applications, for example as the actuating master cylinder for an automotive mechanical clutch operating system.

The reservoir cavity 13 is closed by means of a cap 14 that has a screw threaded connection 15 to the reservoir part, which has a generally cylindrical configuration. A bellows type expansible seal 16 is carried by the cap 14 and prevents direct communication between air admitted through an atmospheric vent port 17 and the fluid contained within the reservoir cavity 13.

The reservoir part 12 is provided with a further, generally cylindrically configured projection 18 that extends generally at right angles to the reservoir cavity 13 and which is formed with an annular recess 19. The reservoir part 12 may be formed from a suitable material, such as cast iron or the like.

A cylinder part, indicated generally by the reference numeral 21 is formed from a material such as steel and has an end part that is affixed, as by a deformed section 22, to the reservoir portion 18. The deformed portion 22 is depressed into the cylindrical recess 19 so as to provide a mechanical interlock. If desired, an annular seal 23 may be positioned in a groove in the reservoir portion 18 outwardly of the recess 19 so as to assist in sealing.

Figure 2:
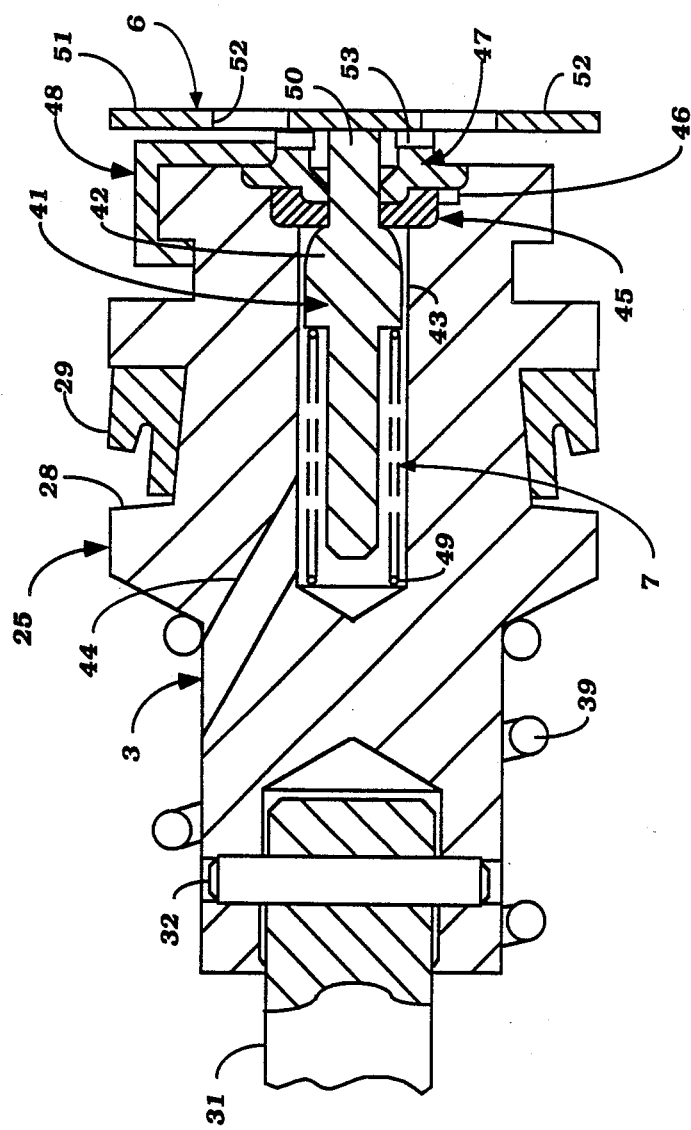
FIG. 2 is an enlarged cross-sectional view of the area encompassed by the circle in FIG. 1.

The cylindrical part 21 forms a cylinder bore 24 in which a piston, indicated generally by the reference numeral 25 and shown in most detail in FIG. 2, is slidably supported. The piston 25 divides the cylinder bore 24 into a first chamber 26 and a second chamber 27 which second chamber extends into the reservoir part 12.

The piston 25 is provided with an annular groove 28 in which a suitable seal 29 is contained so as to seal the chambers 26 and 27 of the cylinder bore from each other. In the illustrated embodiment, the master cylinder 11 is of the pull type. That is, the chamber 26 is pressurized by applying a pulling force on the piston 25. To this end, a pull rod 31 is provided which has a pin connection 32 to the piston 25. The pull rod 31 extends through an outer closure 33 that is affixed to the outer end of the cylindrical part 21 with a seal 34 being interposed therebetween. The closure 33 has a sliding engagement with the pull rod 31 and thus affords guiding movement for it. An annular seal 35 is contained within a counter bore 36 of the closure 33 for effecting sealing.

The pull rod 31 has a trunion portion that can be connected to a mechanical operator for urging the piston 25 to the left and pressurizing the chamber 26. This fluid pressure is transmitted through an outlet fitting 37 to a pressure line 38 for actuating the associated automotive system. A coil compression spring 39 is received within the bore portion 26 for urging the piston 25 to its at rest position.

A recuperation system is provided for permitting fluid to flow, under certain conditions, from the chamber 27 to the chamber 26. This recuperation system includes a recuperation valve, indicated generally by the reference numeral 41. The recuperation valve 41 includes a valve plunger 42 that is slidably supported within a bore 43 formed coaxially within the piston 25. The bore 43 is opened through the right hand of end the piston 25 and is intersected at its other end by a passage 44 that communicates with the bore chamber 26.

An elastomeric valve seat 45 is supported within a counter bore 46 formed at the outer end of the bore 43 and is held in place by means of a screwed in retainer 47. The retainer 47 is further retained by a retainer 48 that is snapped over the end of the piston 25. A coil compression spring 49 normally urges the recuperation valve 42 into engagement with the valve seat 45 for preventing flow through the recuperation passage.

The valve 43 has an extending cylindrical portion 50 that is adapted to engage a stop plate 51 in which fluid passages 52 are provided when the piston 25 is in its home or at rest position. Under this condition, the recuperation valve 42 is held off of the seat 45 and fluid may flow from the reservoir chamber 13 through the recuperation passage consisting of the bore 43 and passage 44 to the chamber 26 for fluid makeup. It should be noted that the retainer member 47 is formed with radially extending recesses 53 that afford fluid communication under this circumstance. When the piston 25 is activated, however, the piston 25 will move to the left and the spring 49 will urge the recuperation valve assembly 41 to its closed position and the chamber 26 can be pressurized.

It should be readily apparent that the plate 51 is held against a shoulder formed by the end of the cylindrical portion 18 of the reservoir part 12 so that the machining of a separate stop surface is not required. As a result, an extremely simple and yet highly effective arrangement is provided that pemits low cost, light weight and yet does not sacrifice any functional advantages.

It is to be understood that the foregoing description is that of a preferred embodiment of the invention and that various changes and modifications may be made without departing from the spirit and scope of the invention, as defined by the appended claims. For example, the illustrated embodiment shows the application of the principle of the invention to a "pull type" of master cylinder; however, a number of the facets of the invention can be equally as well employed in connection with more conventional "push type" master cylinders.

We claim:

1. A fabricated pull type master cylinder arrangement comprising a reservoir housing comprised of a first portion defining a cylindrical cavity adapted to contain fluid for makeup and a second portion having a cylindrical outer surface extending at an angle to the axis of said cylindrical cavity, and a cylinder part defined by a tubular member mechanically interlocked at one end thereof with said reservoir housing second portion and defining a bore for receiving a sliding piston, means for forming a closure for the other end of said tubular member and an operator for said sliding piston comprising a pull member affixed to said piston and extending in part through said closure at the other end of said tubular member for connection to an actuator.

2. A fabricated master cylinder as set forth in claim 1 wherein the mechanical interlock between the tubular member and the second portion cylindrical outer surface comprises a circumferential recess formed in a cylindrical portion outer surface and a part of the tubular member deformed into engagement therewith.

3. A fabricated master cylinder as set forth in claim 1 wherein the closure slidably supports the pull rod.

4. A fabricated master cylinder as set forth in claim 3 wherein the mechanical interlock between the tubular member and the second portion cylindrical outer surface comprises a circumferential recess formed in a cylindrical portion outer surface and a part of the tubular member deformed into engagement therewith.

5. A fabricated master cylinder as set forth in claim 4 further including a recuperation passage and recuperation valve means supported at least in part within the piston for permitting flow from the reservoir chamber to the cylinder bore through the piston when the piston is at its at rest position.

6. A fabricated master cylinder as set forth in claim 5 wherein the recuperation valve means is engaged with a stop defined at least in part by a shoulder formed by the second portion when the piston is at its at rest position for holding the recuperation valve in its opened position.

7. A fabricated master cylinder comprising a reservoir housing comprised of a first portion defining a cavity adapted to contain a fluid for makeup and a second projecting portion having an end surface, a second part having a generally cylindrical bore received upon and fixed to said projecting portion with said end surface extending into said cylinder bore and forming a shoulder therein, a piston slidably supported in said cylinder bore and dividing said bore into first and second chambers, means accessible externally of said cylinder bore for moving said piston to pressurize said first bore chamber, recuperation passage means extending through said piston between said first and second second bore chambers, recuperation valve means supported within said piston for controlling the flow through said recuperation passage means, and means forming a stop defined at least in part by said shoulder for holding said recuperation valve means in an opened position when said piston is at an at rest condition.

8. A fabricated master cylinder as set forth in claim 7 wherein the second part is mechanically interlocked with the reservoir housing for fixing the second part to the reservoir housing.

9. A fabricated master cylinder as set forth in claim 8 wherein the mechanical interlock between the second part and the reservoir housing comprises a circumferential recess formed in a cylindrical portion outer surface of the second part and a part of the reservoir housing deformed into engagement therewith.

10. A fabricated master cylinder as set forth in claim 8 wherein the piston is of the pull type and further including a pull member affixed to the piston.

11. A fabricated master cylinder comprising a reservoir housing comprised of a first portion defining a cavity adapted to contain a fluid for makeup and a second projecting portion having an end surface, a second part having a generally cylindrical bore received upon and fixed to said projecting portion with said end surface extending into said cylinder bore and forming a shoulder therein, a piston slidably supported in said cylinder bore, means accessible externally of said cylinder bore for moving said piston to pressurize fluid in said bore, recuperation valve means supported within said piston for controlling a flow of recuperation fluid from said reservoir housing into said bore, and means forming a stop defined at least in part by said shoulder for holding said recuperation valve means in an opened position when said piston is at an at rest condition.

* * * * *